(12) United States Patent
Blair et al.

(10) Patent No.: US 8,463,661 B2
(45) Date of Patent: Jun. 11, 2013

(54) CREDIT CARD AUTHORIZATION PROCESS FOR DIRECT SALES SYSTEM EMPLOYING NETWORKED MOBILE COMPUTING DEVICES

(75) Inventors: Ryan Blair, Los Angeles, CA (US); Jade Makani Roberge Charles, San Diego, CA (US)

(73) Assignee: FragMob, LLC, San Diego, CA (US)

( * ) Notice: Subject to any disclaimer, the term of this patent is extended or adjusted under 35 U.S.C. 154(b) by 0 days.

(21) Appl. No.: 13/543,451

(22) Filed: Jul. 6, 2012

(65) Prior Publication Data
US 2013/0110598 A1     May 2, 2013

Related U.S. Application Data

(63) Continuation-in-part of application No. 13/282,419, filed on Oct. 26, 2011.

(51) Int. Cl.
*G06Q 30/00*     (2006.01)
(52) U.S. Cl.
USPC ..... 705/26.1; 705/26.2; 705/26.3; 705/26.35; 705/44
(58) Field of Classification Search
USPC ........................................................ 705/26.1
See application file for complete search history.

(56) References Cited

U.S. PATENT DOCUMENTS

| | | | |
|---|---|---|---|
| 5,689,100 A | 11/1997 | Carrithers | |
| 7,181,419 B1 | 2/2007 | Mesaros | |
| 7,689,469 B1 | 3/2010 | Mesaros | |
| 7,967,195 B2 | 6/2011 | Mascavage | |
| 2001/0025271 A1 | 9/2001 | Allen | |
| 2002/0002500 A1 | 1/2002 | Takahashi | |
| 2002/0156689 A1 | 10/2002 | Spalding | |
| 2003/0101096 A1 | 5/2003 | Suzuki | |
| 2003/0225678 A1 | 12/2003 | Understein | |
| 2004/0249741 A1 | 12/2004 | Understein | |
| 2007/0050246 A1 | 3/2007 | Talavera | |
| 2007/0083400 A1 | 4/2007 | Katz | |
| 2007/0288326 A1 | 12/2007 | Boldin | |

(Continued)

FOREIGN PATENT DOCUMENTS

EP     1436752 A1 *     7/2004

OTHER PUBLICATIONS

AU Richard, et al., A user-centric anonymous authorisation framework in e-commerce environment, 2004, ICEC '04 Proceedings of the 6th international conference on Electronic commerce, pp. 138-147.*

*Primary Examiner* — Bradley B Bayat
(74) *Attorney, Agent, or Firm* — Mark Terry

(57) ABSTRACT

A method on a server for managing discount offers for a plurality of users over a communications network. The method includes receiving a discount offer, wherein a discount offer comprises at least a product or service description, an initial price, a discount price less than the initial price, a minimum number of acceptances and a time deadline, and transmitting the discount offer to the plurality of users. The method further includes receiving acceptances of the discount offer, and executing a preliminary credit card authorization transaction for each acceptance received, at the initial price. The method further includes calculating a number of acceptances, detecting the time deadline, and effectuating a sale of the product or service at the discount price to each user that accepted, if the number of acceptances is greater than or equal to the minimum number of acceptances, including executing a final credit card authorization transaction.

18 Claims, 7 Drawing Sheets

U.S. PATENT DOCUMENTS

| | | |
|---|---|---|
| 2008/0120238 A1 | 5/2008 | Flitcroft |
| 2008/0140447 A1 | 6/2008 | Pourfallah |
| 2008/0162349 A1 | 7/2008 | Pratt |
| 2009/0070171 A1 | 3/2009 | Patterson |
| 2009/0144203 A1 | 6/2009 | Hurry |
| 2009/0144204 A1 | 6/2009 | Hurry |
| 2009/0198622 A1 | 8/2009 | Temte |
| 2009/0276305 A1* | 11/2009 | Clopp .................. 705/14.16 |
| 2010/0057614 A1 | 3/2010 | Rainey |
| 2010/0191580 A1 | 7/2010 | Chatter |
| 2010/0287044 A1* | 11/2010 | Mason .................. 705/14.13 |
| 2010/0287103 A1 | 11/2010 | Mason |
| 2011/0087554 A1* | 4/2011 | Roberts .................. 705/26.3 |
| 2011/0288951 A1* | 11/2011 | McKenzie ................. 705/26.2 |
| 2011/0313840 A1* | 12/2011 | Mason et al. ............. 705/14.35 |

* cited by examiner

TIERED DISCOUNT OFFER

| Quantity of Product Sold | Per Unit Price of Product |
|---|---|
| 0-100 | $150 |
| 100-200 | $100 |
| 200-300 | $75 |
| >300 | $50 |

CREDIT CARD AUTHORIZATION PROCESS FOR DIRECT SALES SYSTEM EMPLOYING NETWORKED MOBILE COMPUTING DEVICES

CROSS-REFERENCE TO RELATED APPLICATIONS

This patent application is a continuation-in-part of, and claims priority to, U.S. patent application Ser. No. 13/282,419, filed Oct. 26, 2011, titled "Group Offers for Direct Sales System Employing Networked Mobile Computing Devices." The subject matter of U.S. patent application Ser. No. 13/282,419 is hereby incorporated by reference in its entirety.

STATEMENT REGARDING FEDERALLY SPONSORED RESEARCH OR DEVELOPMENT

Not Applicable.

INCORPORATION BY REFERENCE OF MATERIAL SUBMITTED ON A COMPACT DISC

Not Applicable.

FIELD OF THE INVENTION

The present invention relates to the field of sales, advertising and marketing and, more specifically, the present invention relates to the field of direct sales activities on electronic devices.

BACKGROUND OF THE INVENTION

The present invention relates to direct sales activities of all types. Direct selling is the marketing and selling of products directly to consumers away from a fixed retail location. Modern direct selling includes sales made through a party plan, one-on-one demonstrations, and other personal contact arrangements, as well as internet sales. Thus, direct sales include direct personal presentation, product demonstration, and sales of products and services to consumers, usually in their homes or at their jobs. One form of direct selling includes multi-level marketing (MLM), which is a marketing strategy in which a sales force is compensated not only for product sales they personally generate, but also for the product sales of others they recruit, thereby creating a downstream of distributors and a hierarchy of multiple levels of compensation.

There is a need to offer discounts to consumers of direct sales. Discounts can be a fundamental part of sales strategies for many goods and services. Discounts can be used by vendors to promote and increase sales of their goods and services. Further, consumers use discounts to reduce their expenditures. Discount methods include providing coupons and rebates to potential consumers, but these methods have several drawbacks, such as diminutive amounts of consumer participation and fraud. Also, advertising and marketing associated with coupons and rebates can be expensive and ineffective when disseminated via conventional methods, such as radio and television. Further, there is little or no incentive for a consumer to promote or market an advertisement or coupon to others, thereby forcing vendors to promote and market discounts to each consumer.

Another drawback of current discount techniques includes the risk taken by the vendor due to an inadequate sales volume. Usually, a merchant will offer coupons or rebates in anticipation of producing future sales at full price, repeat sales and a general increase in sales. At the end of the day, merchants cannot offer goods and services at a discount unless the merchant can ensure a minimum number of sales to justify the discount. There is currently no system to mutually satisfy a consumer with a discount and a merchant with a minimum number of sales. There is also no current system that creates an incentive for consumers to distribute the information about the discount.

Yet another drawback of current discount techniques involves credit card payment transactions in certain situations. A common problem occurs when the monetary amount that is the subject of a preliminary credit card authorization transaction subsequently changes between the time the authorization hold is placed on the cardholder's account, and when the credit card transaction is settled in a final credit card authorization transaction. This commonly occurs in situations where the final debit amount is uncertain at the time the preliminary credit card authorization transaction is executed. Problems with credit card transactions may arise, therefore, during dynamic discount programs and reduced price promotions, where prices may fluctuate in short periods of time.

Therefore, what is needed is a system and method for improving the problems with the prior art, and more particularly for a more efficient method and system for facilitating direct sales activities by offering consumer discounts and accepting credit card payments.

BRIEF SUMMARY OF THE INVENTION

In one embodiment, the present invention discloses a method on a server for managing discount offers for a plurality of users over a communications network. The method includes receiving a discount offer, wherein a discount offer comprises at least a product or service description, an initial price, a discount price less than the initial price, a minimum number of acceptances of the discount offer that are required to trigger the discount price and a time deadline for the discount offer, and transmitting the discount offer to mobile computers of the plurality of users via the communications network. The method further includes receiving acceptances of the discount offer from the mobile computers of the plurality of users, and executing a preliminary credit card authorization transaction for each acceptance received, wherein the preliminary credit card authorization is effectuated for the initial price. The method further includes calculating a number of acceptances of the discount offer, detecting attainment of the time deadline, and effectuating a sale of the product or service of the discount offer at the discount price to each user that accepted the discount offer, if the number of acceptances of the discount offer is greater than or equal to the minimum number of acceptances of the discount offer, wherein effectuating a sale comprises executing a final credit card authorization transaction.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Figure 1:
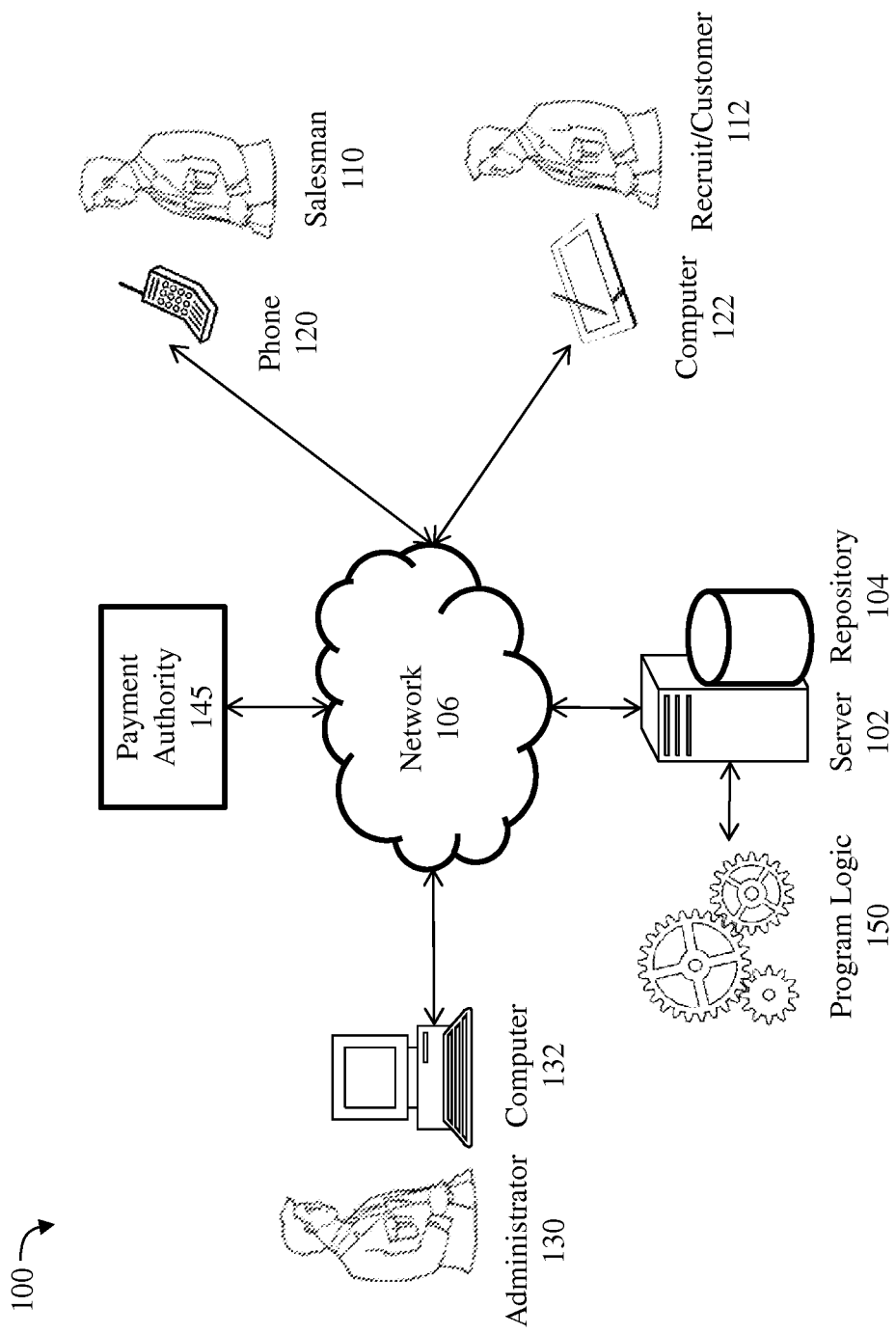
FIG. 1 is a block diagram illustrating the network architecture of a system for providing management of sales activities, discount offers and data over a communications network, in accordance with one embodiment of the present invention.

The present invention improves upon the problems with the prior art by providing a discount offer system that allows for the collection of electronic payment information from consumers (such as credit card information) and the execution of preliminary credit card authorization transactions while a discount offer is pending and product prices are still in flux. As explained above, a common problem occurs when the final debit amount of a credit card transaction is uncertain at the time the preliminary credit card authorization transaction is executed. The present invention, however, takes advantage of the fact that payment gateways and acquiring banks generally allow the final debit amount of a credit card transaction to be lower than the amount of the preliminary credit card authorization transaction. That is, credit card transactions wherein the final credit card authorization transaction amount is lower than the preliminary credit card authorization transaction amount are generally permitted by payment gateways and acquiring banks.

Thus, the present invention implements a discount offer system wherein a customer that accepts an offer undergoes a preliminary credit card authorization transaction for an amount that may be higher than the final credit card authorization transaction amount, depending on how many customers accept the offer. This feature allows the system of the present invention to effectively capture a potential customer early in a discount offer time period, thereby reducing the possibility that he may change his mind during the discount offer period. The aforementioned feature further allows even those customers who accepted a discount offer early in the discount offer period to benefit from a discount that may be triggered later in time, due to additional acceptances of the offer from other customers.

Additionally, the present invention improves upon the problems with the prior art by providing a discount offer method that provides discounts for consumers while at the same time providing a minimum number of discounted sales for vendors. Group buying, also known as collective buying, offers products and services at significantly reduced prices on the condition that a minimum number of buyers make the purchase. The present invention also guarantees that the discounted price will only have to be honored if a minimum number of customers accept the discount offer or group buying offer for the goods or services. Accordingly, a vendor can provide a greater or deeper discount knowing that at least a certain number of sales will occur at that discount.

The present invention further provides a system that grants commissions for the discounted sales to the users that recruited the buyers, thereby providing an incentive for recruiters to push the discount offers or group buying offers. This provides a triple-incentive system whereby a) consumers have a financial incentive to purchase discounted goods or services via the discount offers, b) the recruiters of the consumers have an incentive (i.e., a commission) to persuade the consumers to purchase the discounted goods or services, and c) consumers have a financial incentive to persuade other consumers to purchase the discounted goods or services, since additional acceptances of the discount offer could lead to additional discounts to all accepting consumers.

Finally, the present invention improves upon the prior art by providing technologically advanced methods for advertising and promotion in a direct sales environment using mobile technology. The present invention employs the use of push technology to push offers, promotions and ads to customers and salesmen. This is advantageous as it facilitates commerce over a communications network and speeds up the process of fielding offers, promotions and ads to a large sales force.

Referring now to the drawing figures in which like reference designators refer to like elements, there is shown in FIG. 1 an illustration of a block diagram showing the network architecture of a system 100 and method for providing management of direct sales activities, discount offers and data over a communications network in accordance with the principles of the present invention. A prominent element of FIG. 1 is the server 102 associated with repository or database 104 and further coupled with network 106, which can be a circuit switched network, such as the Public Service Telephone Network (PSTN), or a packet switched network, such as the Internet or the World Wide Web, the global telephone network, a cellular network, a mobile communications network, or any combination of the above. Server 102 is a central controller or operator for the functionality that executes on computers 120, 122 and 132, namely, the processing of sales and enrollment transactions, as well as the processing of aggregate sales data and discount offers, all of which are provided to the users 110, 112 and 130, wherein the provision of the foregoing services and data facilitates the performance of direct sales activities. Aggregate sales data, or aggregate data pertaining to sales, pertains to an aggregation, or a cumulative sum, for example, of all sales that are effectuated by a single salesman, by one of the salesman's recruits, by all of the salesman's recruits, any combination of the above, or the like.

FIG. 1 further includes mobile computers 120 and 122, which may be smart phones, mobile phones, tablet computers, handheld computers, laptops, or the like. Mobile computers 120 and 122 correspond to a salesman 110 and a recruit or customer 112 of the salesman 110. A salesman 110, also known as a distributor, is a member of a direct sales force who sells products to customers and recruits others to do the same. A salesman's recruits may also be known as distributors. A salesman 110 receives compensation for his own product sales, as well as the sales of his recruits, often via a commission. A customer simply refers to a person to whom a salesmen sales products or services. Computer 132 corresponds to an administrator 130, who may perform supervisory or administrative tasks on server 102. Administrator 130 may, for example, set sales milestones for the users 110, 112 and prepare and disseminate discount offers. Computer 132 may be a mobile computer, a desktop computer, a common computer terminal or the like.

FIG. 1 further shows that server 102 includes a database or repository 104, which may be a relational database comprising a Structured Query Language (SQL) database stored in a SQL server. Client computers 120, 122 and 132 may also each include their own database. The repository 104 serves data from a database, which is a repository for data used by server 102 and the client computers during the course of operation of the invention.

The database 104 may include a user record for each salesman 110 and recruit or customer 112. A user record may include: contact/identifying information for the user, contact/identifying information for the participant that recruited the user (if any), information pertaining to sales attributed to the user, contact/identifying information for recruits of the user, information pertaining to recruitment activity of the user, information pertaining to sales attributed to recruits of the user, electronic payment information for the user, information pertaining to calls made by the user, information pertaining to the purchases made by the user, etc. A user record may also include a unique identifier for each user, a residential address for each user, the current location of each user (based on location-based services from the user's mobile computer) and a description of past products purchased by each user. A user record may further include demographic data for each user, such as age, sex, income data, race, color, marital status, etc. Recruit enrollment data includes any data that is entered into a user record for a recruit or customer 112 when the recruit or customer is recruited and enrolled by a salesman 112.

Sales transaction data, for example, may be stored in the database 104 and associated with a record for the user initiating the sale and/or the customer purchasing products or services. Sales transaction data may include one or more product identifiers, one or more product amounts, buyer contact/identifying information, product shipping information and electronic payment information. In one embodiment, electronic payment information may comprise buyer contact/identifying information, credit card data garnered from a credit or debit card and authentication information.

The database 104 may also include a record for each administrator 130. A record for an administrator may include: commission data that defines how salesmen are compensated for their own sales, commission data that defines how salesmen are compensated for the sales of their recruits, milestone data that defines thresholds that result in an award, personal sales goals, group sales goals, discount offers, etc.

The database 104 may further include a record for each discount offer or group buying offer created by a user, such as administrative user 130. A discount offer or group buying offer may comprise a product or service description, an image of the product or service, an initial price of the product or service, a first discount price, a first minimum number of acceptances of the offer that are required to trigger the first discount price, an expiration date and time for the offer (i.e., a time deadline for the discount offer), a current number of acceptances of the offer, computer program code that comprises a countdown timer that counts down to the time at which the offer expires, etc. In another embodiment, a group buying offer may comprises a tiered discount system wherein a first number of acceptances triggers a first discount price lower than the initial price, a second (higher) number of acceptances triggers a second (lower) discount price, a third (even higher) number of acceptances triggers a third (even lower) discount price, and so on and so forth. See FIG. 5 for an example of a tiered discount offer.

FIG. 1 shows an embodiment of the present invention wherein networked computing devices 120, 122 and 132 interact with server 102 and repository 104 over the network 106. Server 102 includes a software engine that delivers applications, data, program code and other information to networked computing devices 120, 122 and 132. The software engine of server 102 may perform other processes such as audio and/or video streaming or other standards for transferring multimedia data in a stream of packets that are interpreted and rendered by a software application as the packets arrive. It should be noted that although FIG. 1 shows only three networked computing devices 120, 122 and 132, the system of the present invention supports any number of networked computing devices connected via network 106.

Server 102 includes program logic 150 comprising computer source code, scripting language code or interpreted language code that may be compiled to produce an executable file or computer instructions that perform various functions of the present invention. Program logic 150 may reside on a client computer (such as 120, 122, and 132), the server 102 or any combination of the two.

Note that although server 102 is shown as a single and independent entity, in one embodiment of the present invention, the functions of server 102 may be integrated with another entity, such as one of the client computers or payment authority 145. Further, server 102 and its functionality, according to a preferred embodiment of the present invention, can be realized in a centralized fashion in one computer system or in a distributed fashion wherein different elements are spread across several interconnected computer systems.

The network architecture of FIG. 1 in accordance with the principles of the present invention may give rise to various revenue-generating arrangements. The users 110, 112 may, for example, sale and/or purchase products or services via the present invention and recruit others to do the same. The users 110, 112 may also, for example, pay an ongoing or per-transaction fee to the operators of server 102 in exchange for the services provided by server 102.

FIG. 1 also shows a payment authority 145 to effectuate payments by salesman 110 and/or recruit/customer 112 for products, services or the like. In the course of a sales transaction, the program logic 150 may interface with payment authority 145 to effectuate payment. In one embodiment of the present invention, the payment authority 145 is a payment gateway, which is an e-commerce Application Service Provider (ASP) service that authorizes payments for individuals, e-businesses, online retailers, or traditional brick and mortar businesses. The payment authority 145 may accept payment via the use of credit cards, charge cards, bank cards, gift cards, account cards, etc.

Figure 2:
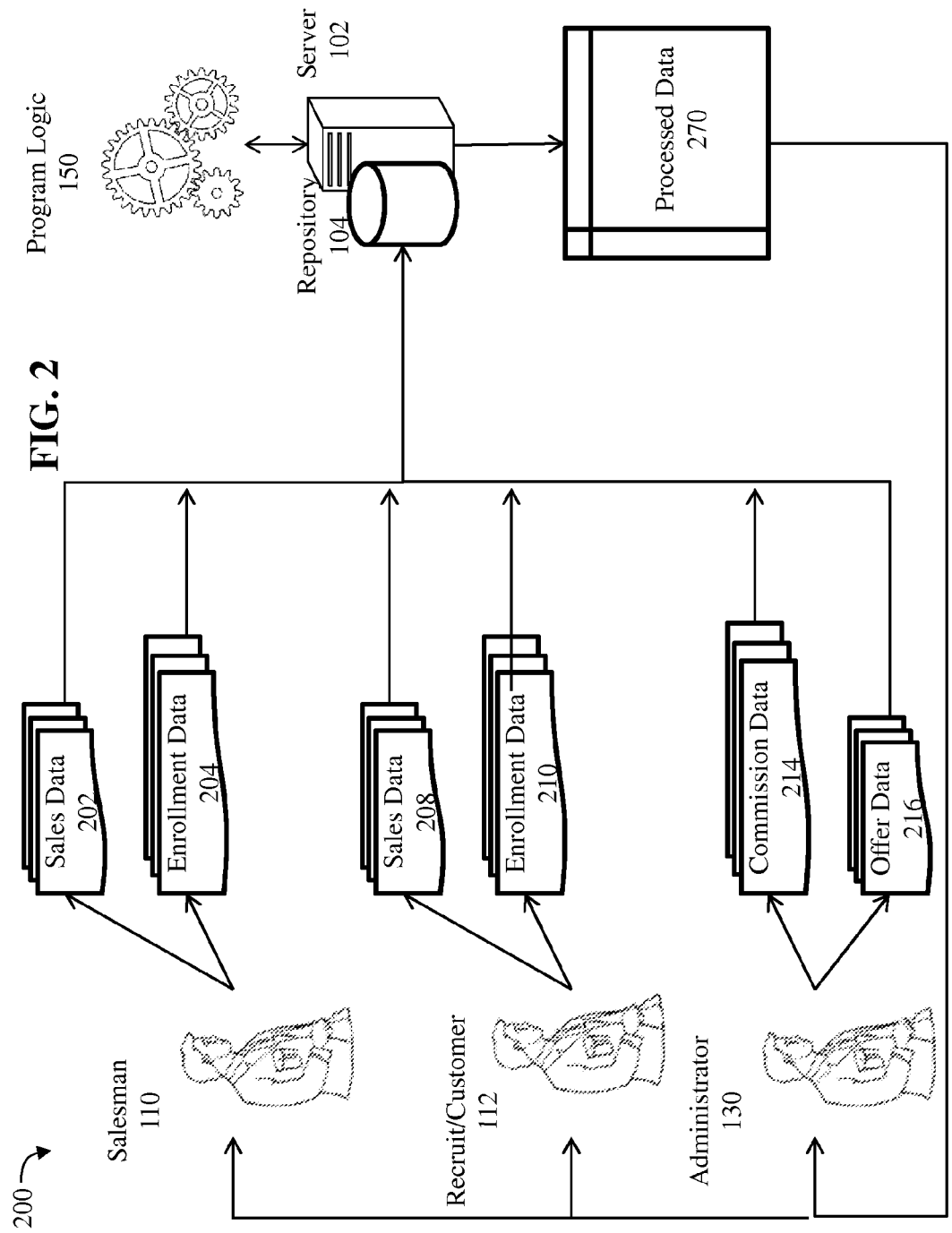
FIG. 2 is a block diagram showing the various data that is entered, stored, processed and managed according to one embodiment of the present invention.

FIG. 2 is a block diagram 200 showing the various data that is entered, stored, processed and managed according to one embodiment of the present invention. FIG. 2 shows that salesman 110 may enter various data sets into repository 104 for processing and management by program logic 150 on server 102. Salesman 110 may enter sales transaction data 202, which pertains to sales of products effectuated by the salesman 110. Salesman 110 may also enter recruit enrollment data 204, which pertains to recruitment of others to participate in the sales force. Data sets 202, 204 may be entered into repository 104 by the salesman 110 via its client computer 120, using a mobile app or a similar means. A mobile app is a software application, usually designed to run on smartphones and tablet computers. Note that data sets 202, 204 entered into repository 104 are associated with the user record for salesman 110. To the extent that certain information within data sets 202, 204 is associated with another user, such as recruitment enrollment data being associated with recruit 112, the aforementioned data may also be associated with the user record for recruit 112.

FIG. 2 also shows that recruit 112 may enter various data sets into repository 104 for processing and management by program logic 150 on server 102. Recruit 112 may enter sales transaction data 208, which pertains to sales of products effectuated by the recruit 112, and recruit enrollment data 210, which pertains to recruitment of others to participate in the sales force. Data sets 208, 210 may be entered into repository 104 by the recruit 112 via its client computer 122, and data sets 208, 210 are associated with the user record for recruit 112. To the extent that certain information within data sets 208, 210 is associated with another user, such as any sales, which are inherently related to salesman 110 (since salesman 110 recruited recruit 112), the aforementioned data may also be associated with the user record for salesman 110.

FIG. 2 further shows that administrator 130 may enter various data sets into repository 104 for processing and management by program logic 150 on server 102. Administrator 130 may enter commission data 214 or sales award milestone data pertaining to one or more users. Administrator 130 may also enter offer data 216, which may comprise a coupon, a discount, a group buying offer, a discount offer, a deal of the day or the like. Data sets 214 and 216 may be entered into repository 104 by the administrator 130 via its client computer 132. Note that data sets 214 and 216 entered into repository 104 are associated with the user record to which the data pertains.

The data sets entered by the various parties may be processed by program logic 150 on server 102 and presented for viewing to administrator 130, salesman 110 and recruit 112 as processed data 270 via network 106. Specifically, processed data 270 may be sent to the computers 132, 120, 122 of the entities 130, 110, 112, respectively, via the communications network 106. Processed data 270 may be processed so as to provide compilations or aggregations of the data sets entered by various users into repository 104, such as cumulative data and trend data. For example, processed data 270 may display cumulative sales for each user (by dollar amount and item volume), cumulative sales for groups of recruits recruited by a user, cumulative sales for user or group as it corresponds to certain time intervals or shown over a period of time, total number of recruits for a user, total number of recruits for a user's recruits, projected sales for a user and for the user's recruits, etc.

In one embodiment, the processed data 270 includes commission information for each salesman 110, recruit or customer 112. The commission information may include the past, current or future amount of commission(s) earned by each salesman/recruit/customer according to the formula for calculating a commission, which resides in the data 214 entered by the administrator 130. The formula for calculating a commission may comprise, for example, a certain percentage of gross or net sales of an individual and a certain percentage of gross or net sales of an individual's recruits. The formula for calculating a commission may also take other data into account, such as volume of sales, speed of sales, etc. Processed data 270 may further be processed using any statistical technique to aid interpretation of data. Program logic 150 may also provide for differing views of the processed data 270. In another embodiment of the present invention, processed data 270 comprises a discount offer or group buying offer, which is disseminated to the salesman 110 and/or customers 112, as described in greater detail below with respect to FIG. 3.

Figure 3:
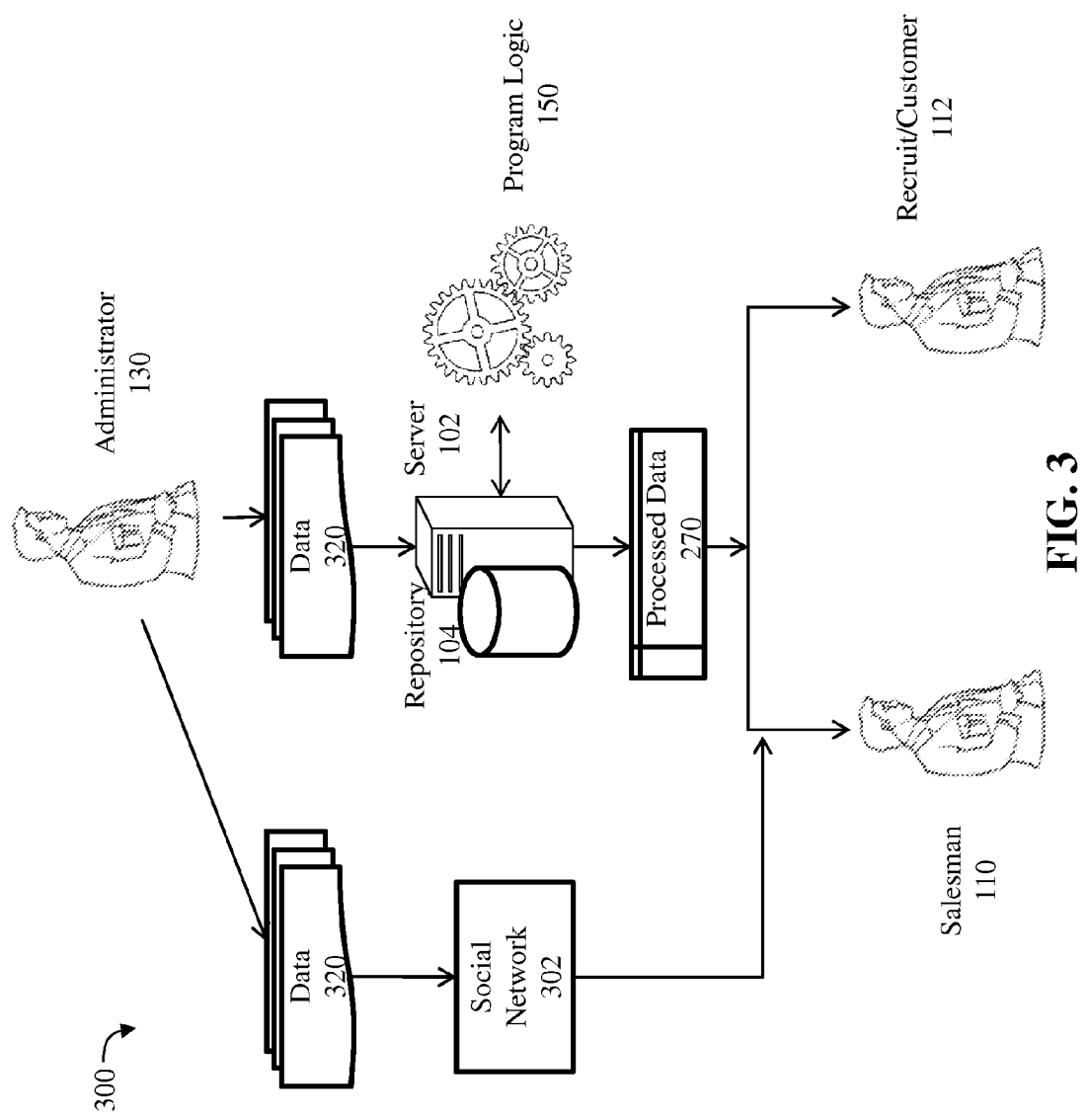
FIG. 3 is a block diagram showing advertising and promotion methods, including discount offers, according to one embodiment of the present invention.

FIG. 3 is a block diagram 300 showing advertising and promotion methods, including discount offers, according to one embodiment of the present invention. The block diagram 300 of FIG. 3 illustrates the process of advanced methods of issuing promotions and ads in a direct sales environment.

FIG. 3 describes a process wherein administrator 130 generates an ad or promotion (hereinafter referred to as an "offer" or a "discount offer") and the server 102 disseminates it to computer 120 of salesman 110 and computer 122 of recruit or customer 112 via push technology over the communications network 106. Push technology, or server push, describes a style of Internet-based communication where the ad or promotion, created by administrator 130, is transmitted by the server 102 to clients. Push technology is contrasted with pull technology, where the request for the transmission of information is initiated by the receiver or client. Examples of push technology include HTTP server push, a pushlet, long polling and Flash XMLSocket relays. Note the invention also supports offers being generated by salesman 110 or customer 112 and pushed to others.

FIG. 3 shows that in one embodiment, administrator 130 generates an offer, such as a discount offer or a group buying offer, encapsulated in data packet 320, and sends it to the server 102. The data packet 320 may include a description of goods being promoted, a percentage discount on goods, a price for goods, a rebate on goods, still images, video, audio, a time limit for the promotion or sale, or the like. The data packet 320 may also include target data pertaining to the target for the offer, such as a geographical location, a region, a time period, demographic data describing individuals to which the offer is directed (age range, gender, marital status, income level, etc.) and/or specific names or address of the individuals to which the offer is directed. In one embodiment of the present invention, the offer encapsulated in data packet 320 is a discount offer or group buying offer, as defined above.

The generated data packet 320 is then provided to server 102, wherein logic 150 of server 102 processes the data packet and determines how to implement it. For example, the logic 150 of server 102 may determine to whom the corresponding offer is transmitted, based on the target data specified in the data packet 320. The program logic 150 may accomplish the step of determining to whom the offer shall be transmitted by searching the profiles of users in database 104 for those profiles with data that matches the target data. In another example, the logic 150 of server 102 determines when and for how long the offer is valid, based on information specified in the data packet 320.

Once processed, the server 102 transmits the corresponding offer, as processed data 270, to the intended recipients, such as users 110 and 112, via push technology at the specified time. Specifically, server 102 transmits the offer, as processed data 270, to the mobile computers 120 and 122 of the users 110 and 112, respectively. In one embodiment, the server 102 transmits offers specified in the data packet 320 based on a location based service. A location based service is an information or entertainment service, accessible with mobile devices through the mobile network and utilizing the ability to make use of the geographical position of the mobile device. In this embodiment, the corresponding data packet 320 may specify that an offer shall be transmitted solely to users that are located within a specified geographical area. Consequently, the server 102 transmits the offer of the data packet 320, as processed data 270, based on the location of the users 110 and 112, as provided by the location based service.

In one embodiment, the generated data packet 320 is provided to a third party social network 302 via the web 106, which processes the data packet and determines how to implement it, similar to the implementation of server 102. Once processed, the social network 302 transmits the corresponding offer to the intended recipients, such as users 110 and 112. Specifically, the social network 302 transmits the offer to the mobile computers 120 and 122 of the users 110 and 112. In yet another embodiment, the third party social network 302 transmits offers specified in the data packet 320 based on a location based service.

Consequently, users, such as users 110, 112, may accept the offer of the data packet 320, which may be a discount offer or a group buying offer. The process for accepting discount offers and effectuating a sales transaction is described in greater detail below with reference to FIG. 4A.

Figure 4A:
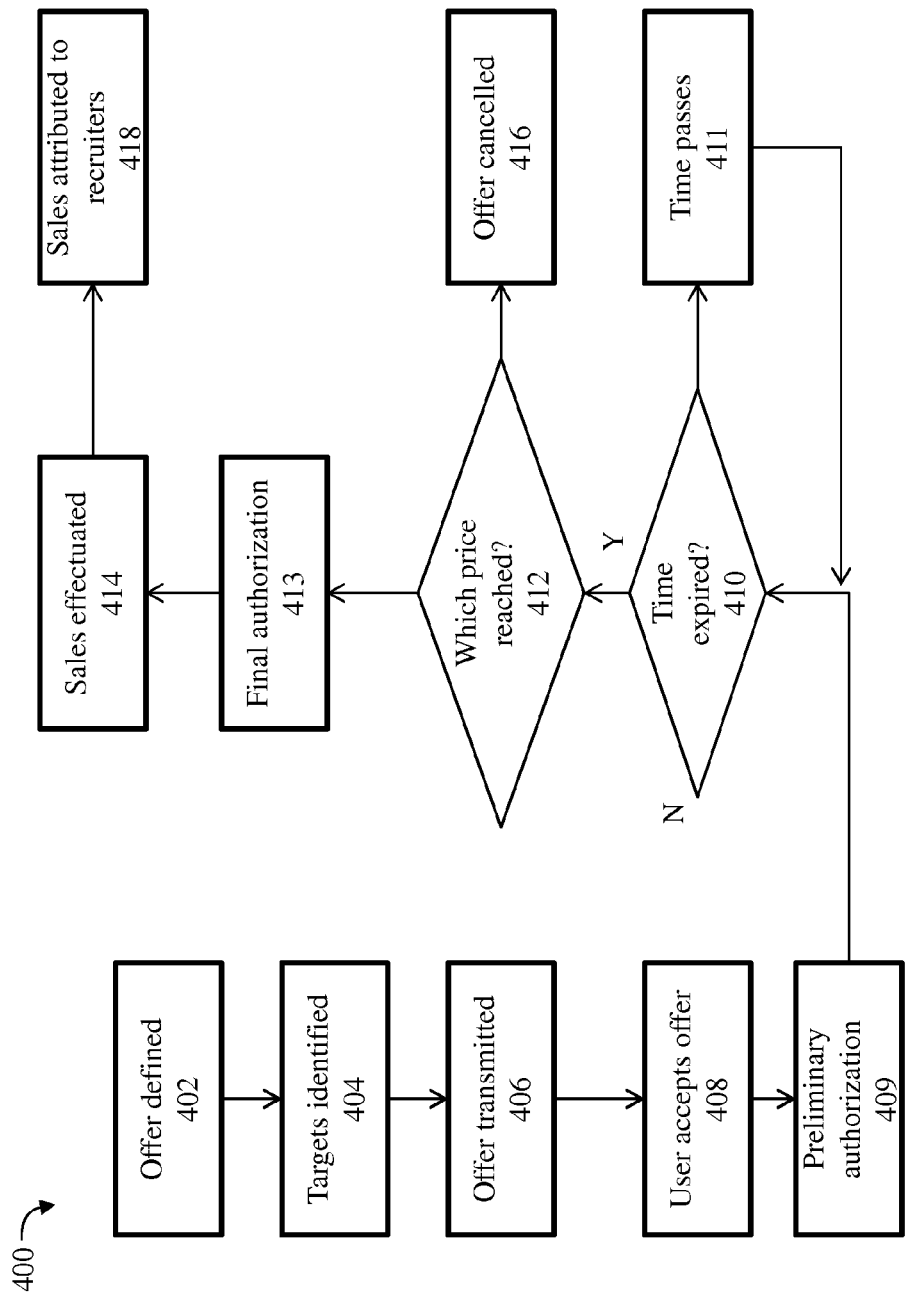
FIG. 4A is a flow chart depicting the control flow of a discount buying process, according to one embodiment of the present invention.

FIG. 4A is a flow chart depicting the control flow of a discount buying process 400, according to one embodiment of the present invention. In step 402, administrator 130 defines a discount offer or group buying offer, as defined above. The discount offer or group buying offer may further comprise a tiered discount system wherein a first number of acceptances triggers a first discount price lower than an initial price of the product or service, a second (higher) number of acceptances triggers a second (lower) discount price, a third (even higher) number of acceptances triggers a third (even lower) discount price, etc. In yet another embodiment, a discount offer or group buying offer may be associated with target data, such as demographic information, that defines the targets of the offer.

In step 404, the program logic 150 of server 102 receives the discount offer or group buying offer and determines to whom it shall be sent depending on the target data associated with the offer. In one embodiment, the mobile computers 120, 122 of the users send current location data to the server 102. The server 102 utilizes the location data of the users, as well as any other information associated with a user's record in the database 104, to determine whether, and to whom, the offer shall be transmitted. In step 406, the server 102 transmits the offer, as processed data 270, to the mobile computers of the users via the network 106.

In step 408, a consumer, such as customer 112, accepts the offer. An acceptance may be effectuated by a customer when he interacts with his computer 122. The customer may, for example, press a "purchase" button in a mobile application executing on his computer 122. An acceptance may also include the individual entering electronic payment information. Alternatively, a customer's electronic payment information may already be stored in association with his user record in database 104, in which case the customer may press a "purchase" button in a mobile application executing on his computer 122, and subsequently, program logic 150 of server 102 accesses his electronic payment information from the database 104.

In step 409, program logic 150 utilizes the electronic payment information of the customer 112 to execute a preliminary credit card authorization transaction at the initial price of the offer. A preliminary credit card authorization may be referred to as an authorization hold, card authorization, pre-authorization, or preauth. These terms refer to the practice within the banking industry of authorizing electronic transactions done with a debit card or credit card and holding a defined monetary amount as unavailable for the card holder either until the merchant clears the transaction (also called settlement), or the hold expires or falls off. For example, when a merchant swipes a customer's credit card, the credit card terminal connects to the merchant's acquirer, or credit card processor, which verifies that the customer's account is valid and that sufficient funds are available to cover the transaction's cost. At this step, the funds are "held" and deducted from the customer's credit limit (or bank balance, in the case of a debit card) but are not yet transferred to the merchant. Later in the process, as defined below, funds are transferred from the customer's accounts to the merchant's accounts.

In an embodiment where the discount offer comprises a tiered discount system, in step 409, program logic 150 utilizes the electronic payment information of the customer 112 to execute a preliminary credit card authorization transaction at the current discount price of the offer, according to the current number of acceptances of the discount offer. See, for example, FIG. 5, which shows a tiered discount offer. If the current number of acceptances is 150, for example, then the current discount price of the offer would be $100 for a product, according to FIG. 5. Thus, in this embodiment, in step 409, program logic 150 executes a preliminary credit card authorization transaction at the current discount price of the offer, according to the current number of acceptances.

In step 410, it is determined whether the time deadline of the offer has been reached. If so, then control flows to step 412. If the time deadline of the offer has not been reached, then control flows to step 411 where additional time passes and additional consumers are provided with the opportunity to accept the offer, thereby adding to the current number of acceptances of the discount offer. Control flows back to step 410 after step 411.

In an embodiment wherein the discount offer comprises a single tier with only one discount price at a minimum number of acceptances, in step 412, the program logic 150 of server 102 determines whether the discount price has been reached, according to the minimum number of acceptances for that offer. If the discount price has been reached, then in step 413, program logic 150 of server 102 executes a final credit card authorization transaction at the discount price of the offer. If the discount price has not been reached, then in step 413, program logic 150 of server 102 executes a final credit card authorization transaction at the initial price of the offer. A final credit card authorization transaction may be referred to as settlement of a previous preliminary credit card authorization transaction or authorization hold. A final credit card authorization transaction, often performed by merchants at the end of a business day, comprises a merchant instructing a credit card machine or interface to submit finalized credit card purchase transactions to the acquirer (or acquiring bank, i.e., the bank or financial institution that processes credit and or debit card payments for products or services for a merchant) in a "batch transfer," which begins the settlement process, wherein the funds are transferred from the customer's accounts to the merchant's accounts.

Figure 5:
FIG. 5 is a chart showing a tiered discount offer, according to one embodiment of the present invention.

In an embodiment wherein the discount offer comprises a multiple tiered discount offer, such as that shown in FIG. 5, in step 412, the program logic 150 of server 102 determines which tier, if any, has been met by the current number of acceptances. Recall that a first number of acceptances triggers a first discount price lower than the initial price, a second (higher) number of acceptances triggers a second (lower) discount price, a third (even higher) number of acceptances triggers a third (even lower) discount price, etc. If any tier has been reached, according to the current number of acceptances, in step 413, program logic 150 of server 102 executes a final credit card authorization transaction at the current discount price corresponding to the number of acceptances of the multiple tiered discount offer (see FIG. 5). If no tier has been reached, in step 413, program logic 150 of server 102 executes a final credit card authorization transaction at the initial price of the offer.

In one embodiment of the present invention, if, in step 412, it is determined that no minimum number of acceptances has been reached or that no tier of the multiple tiered discount offer has been reached, then control flows to step 416. In step 416, all of the accepting users are notified that the discount offer has been cancelled.

In step 414, all of the accepting users are notified that the discount offer has concluded and that a sale of the product or service has been effectuated at a given price. Consequently, arrangements are made to deliver or ship the product or service to the accepting users.

In step 418, the program logic 150 of server 102 determines the recruiter, if any, of each of the accepting users, so as to attribute the sale of the product or service to the recruiter. The program logic 150 of server 102 then stores the sales transaction data of each sale in association with the user record for the recruiter responsible for the consumer that made the purchase. This information may later be used to calculate and effectuate the payment of a commission to the recruiter.

Figure 4B:
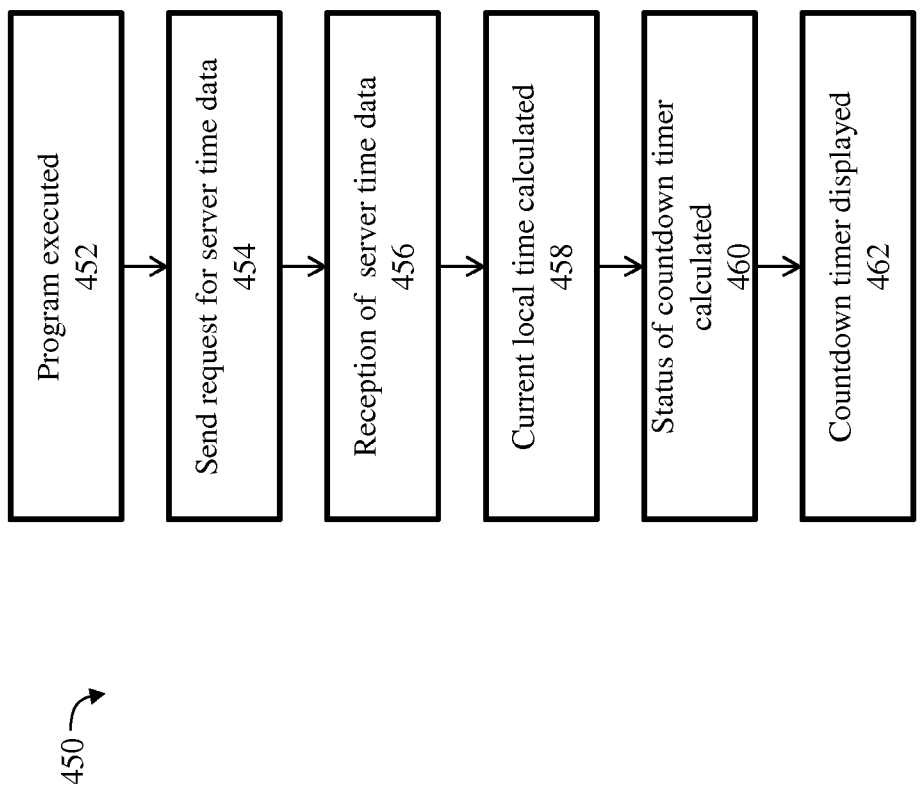
FIG. 4B is a flow chart depicting the control flow of the countdown timer process, according to one embodiment of the present invention.

FIG. 4B is a flow chart depicting a control flow of a countdown timer process 450, according to one embodiment of the present invention. Recall from above that a discount offer or group buying offer may comprise, among other things, computer program code that comprises a countdown timer that counts down to the time at which the offer expires, i.e., the time deadline for the discount offer). Also recall from FIG. 3 that salesman 110 and/or customers 112 received processed data 270 from server 102, wherein the processed data 270 may comprise a discount offer or group buying offer.

It is assumed before the execution of the steps of FIG. 4B that at least a portion of the program logic 150 resides on a client computer, such as mobile phone 120. The mobile phone 120 may have received program logic 150 within the processed data 270 that was disseminated, as described in FIG. 3 above. In this example, program logic 150 comprises an app, mobile app, mobile application or software application, designed to run on smart phones and tablet computers.

In step 452 program logic 150 is executed. This step may have occurred when the program logic 150 was initially received or on subsequent occasions when the user 110 or mobile phone 120 re-initializes or runs the program logic 150.

In step 454, program logic 150 sends, via network 106, a request for server time data to server 102. Recall that the discount offer or group buying offer, including the time deadline of the offer, may be stored in database 104. In step 454, the program logic 150 sends a request to server 102 for server time data, which may include, among other things, the current local time of server 102, the time zone of server 102, the remaining amount of time between the current local time of server 102 and the time deadline of the group buying offer, which is provided in terms of the local time of server 102.

In step 456, the server 102 sends, via network 106, the requested server time data to mobile phone 120 and the program logic 150 of mobile phone 120 receives the aforementioned requested data. In step 458, the program logic 150 of mobile phone 120 calculates the current local time of mobile phone 120. There are various well-known methods of calculating current local time by a mobile phone or tablet computer, which include processes such as keeping and maintaining local time on the mobile phone or tablet computer, accessing network time data from a cellular network or other data provider, and performing mathematical operations to account for any difference in time zone between the cellular network or other data provider and the mobile phone or tablet computer.

In step 460, the program logic 150 of mobile phone 120 calculates the current status of the countdown timer using the data received in step 456 and the current local time of mobile phone 120, which was calculated in step 458. The current status of the countdown timer may refer to the current amount of absolute time remaining until the time deadline of the group buying offer. For example, if there are two hours and three minutes remaining until the time deadline of the group buying offer, the current status of the countdown timer would be a time value of 02:03:00.

In one embodiment, the step of calculating the current status of the countdown timer may comprise calculating the time difference (attributed to time zone differences) between the current local time of mobile phone 120 and the current local time of server 102, adjusting the time deadline of the group buying offer according to the calculated time difference (such that the time deadline of the group buying offer is provided in terms of local time at phone 120), and calculating an amount of time remaining at the local time zone of mobile phone 120 by subtracting the adjusted time deadline of the group buying offer from the current local time of mobile phone 120. For example, assume server 102 has a local time of 8 am, phone 120 has a local time of 11 am and the time deadline of the discount offer is 12 pm (for local time at server 102). The step of calculating the current status of the countdown timer, may comprise calculating a 3-hour time zone difference between phone 120 and server 102, determining a time deadline of 3 pm (for local time at phone 120) and determining a remaining time of 4 hours.

In yet another embodiment, the step of calculating the current status of the countdown timer may comprise reading the following data received from server 102: the remaining amount of time between the current local time of server 102 and the time deadline of the group buying offer. In step 462, the countdown timer displays the current remaining amount of time until the time deadline of the group buying offer, based on the data calculated in step 460. The display of time may occur in terms of days, months, weeks, hours, minutes and seconds, or any combination of the above. Step 462 may further comprise continuous execution of a timer function wherein the remaining time initially displayed in step 462 is continually depleted in increments of seconds.

Figure 6:
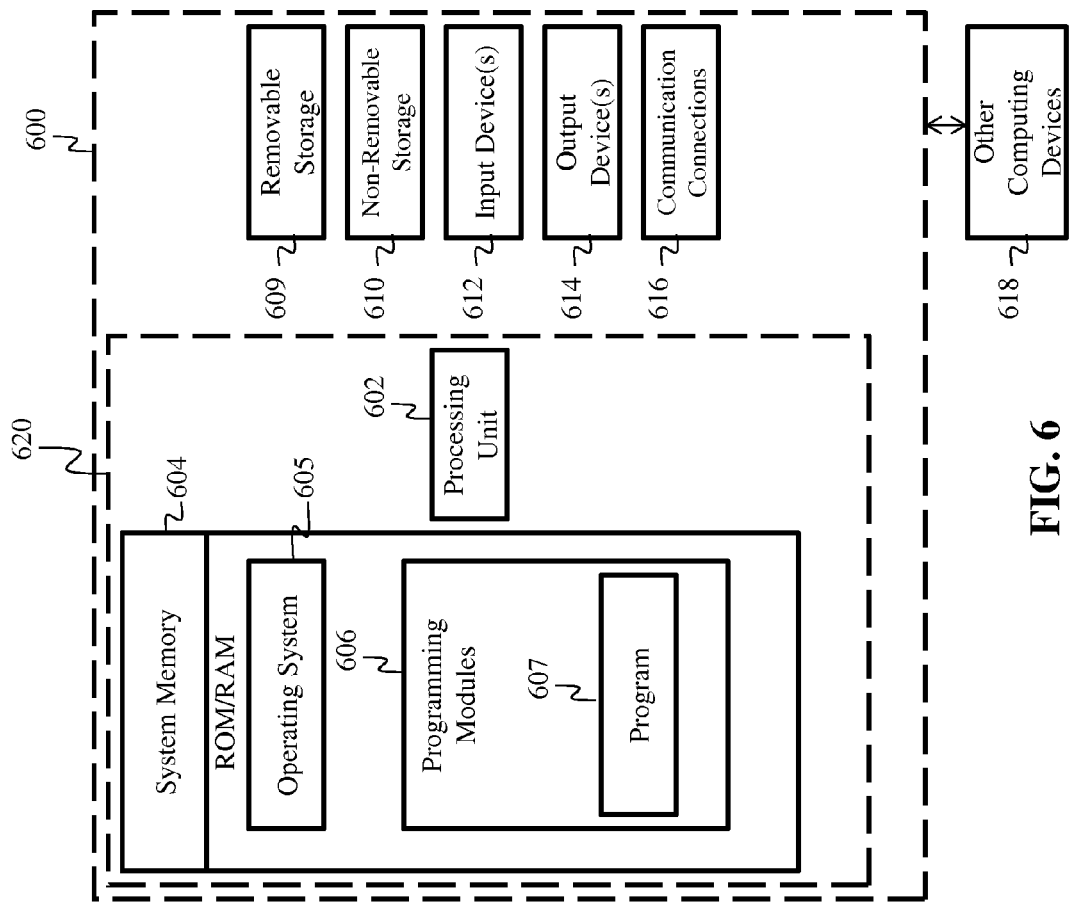
FIG. 6 is a block diagram of a system including an example computing device and other computing devices.

FIG. 6 is a block diagram of a system including an example computing device 600 and other computing devices. Consistent with the embodiments described herein, the aforementioned actions performed by 102, 120, 122, and 130 may be implemented in a computing device, such as the computing device 600 of FIG. 6. Any suitable combination of hardware, software, or firmware may be used to implement the computing device 600. The aforementioned system, device, and processors are examples and other systems, devices, and processors may comprise the aforementioned computing device. Furthermore, computing device 600 may comprise an operating environment for the methods shown in FIGS. 2-4B above.

With reference to FIG. 6, a system consistent with an embodiment of the invention may include a plurality of computing devices, such as computing device 600. In a basic configuration, computing device 600 may include at least one processing unit 602 and a system memory 604. Depending on the configuration and type of computing device, system memory 604 may comprise, but is not limited to, volatile (e.g. random access memory (RAM)), non-volatile (e.g. read-only memory (ROM)), flash memory, or any combination or memory. System memory 604 may include operating system 605, one or more programming modules 606. Operating system 605, for example, may be suitable for controlling computing device 600's operation. In one embodiment, programming modules 606 may include, for example, a program module 607. Furthermore, embodiments of the invention may be practiced in conjunction with a graphics library, other operating systems, or any other application program and is not limited to any particular application or system. This basic configuration is illustrated in FIG. 6 by those components within a dashed line 620.

Computing device 600 may have additional features or functionality. For example, computing device 600 may also include additional data storage devices (removable and/or non-removable) such as, for example, magnetic disks, optical disks, or tape. Such additional storage is illustrated in FIG. 6 by a removable storage 609 and a non-removable storage 610. Computer storage media may include volatile and nonvolatile, removable and non-removable media implemented in any method or technology for storage of information, such as computer readable instructions, data structures, program modules, or other data. System memory 604, removable storage 609, and non-removable storage 610 are all computer storage media examples (i.e. memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 600. Any such computer storage media may be part of device 600. Computing device 600 may also have input device(s) 612 such as a keyboard, a mouse, a pen, a sound input device, a camera, a touch input device, etc. Output device(s) 614 such as a display, speakers, a printer, etc. may also be included. The aforementioned devices are only examples, and other devices may be added or substituted.

Computing device 600 may also contain a communication connection 616 that may allow device 600 to communicate with other computing devices 618, such as over a network in a distributed computing environment, for example, an intranet or the Internet. Communication connection 616 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both computer storage media and communication media.

As stated above, a number of program modules and data files may be stored in system memory 604, including operating system 605. While executing on processing unit 602, programming modules 606 may perform processes including, for example, one or more of the methods shown in FIGS. 2-4B above. The aforementioned processes are examples, and processing unit 602 may perform other processes. Other programming modules that may be used in accordance with embodiments of the present invention may include electronic mail and contacts applications, word processing applications, spreadsheet applications, database applications, slide presentation applications, drawing or computer-aided application programs, etc.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip (such as a System on Chip) containing electronic elements or microprocessors. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, or other forms of RAM or ROM. Further, the disclosed methods' stages may be modified in any manner, including by reordering stages and/or inserting or deleting stages, without departing from the invention.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:
1. A method on a server for managing discount offers for a plurality of users with mobile computers over a communications network, comprising:
   defining a discount offer, wherein the discount offer comprises at least a product or service description, an initial price, a discount price less than the initial price, a minimum number of acceptances of the discount offer that are required to trigger the discount price and a time deadline for the discount offer;
receiving enrollment data from the plurality of users with mobile computers;
identifying the plurality of users with mobile computers that have submitted enrollment data to the server, wherein the enrollment data includes electronic payment information;
transmitting, via the communications network, the discount offer to the mobile computers of the plurality of users that were identified, and further transmitting a countdown timer that counts down to the time deadline of the discount offer;
receiving acceptances of the discount offer from selected ones of the mobile computers of the plurality of users;
determining the initial price from the discount offer and accessing the electronic payment information for each of the plurality of users that have submitted an acceptance of the discount offer to the server; wherein the electronic payment information includes credit card information for each of the plurality of users;
executing a preliminary credit card authorization transaction for each acceptance received, wherein the preliminary credit card authorization is effectuated for the initial price and wherein the preliminary credit card authorization is processed using the electronic payment information from the enrollment data for each of the plurality of users that has submitted the acceptance of the discount offer;
calculating a number of acceptances of the discount offer, wherein the number of acceptances is calculated to be greater than or equal to the minimum number of acceptances of the discount offer;
triggering the discount price;
detecting attainment of the time deadline; and
determining the discount price from the defined discount offer and effectuating a sale of the product or service of the discount offer at the discount price to each of the plurality of users that executed the preliminary credit card authorization transaction, wherein effectuating the sale comprises executing a final credit card authorization transaction at the discount price.

2. The method of claim 1, further comprising:
attributing at least one sale of the product or service to a first user who recruited a buyer of the at least one sale, so as to award a commission to the first user.

3. The method of claim 1, further comprising:
transmitting a current number of acceptances of the discount offer to the mobile computers of the plurality of users via the communications network.

4. The method of claim 1, wherein the step of transmitting the discount offer further comprises:
transmitting computer program code to the mobile computers of the plurality of users together with the discount offer, wherein the computer program code comprises a countdown timer that counts down to the time deadline.

5. The method of claim 4, further comprising:
receiving a request, from the computer program code in a first mobile computer of the plurality of users, for local time at the server; and
transmitting a message to the first mobile computer, wherein the message includes the local time at the server.

6. The method of claim 5, wherein the step of transmitting the discount offer further comprises:
transmitting the discount offer to the mobile computers of a plurality of users that are located in a defined geographical area.

7. A method on a server for managing discount offers for a plurality of users with mobile computers over a communications network, comprising:
defining a discount offer, wherein the discount offer comprises at least a product or service description, an initial price, a first discount price less than the initial price, a first minimum number of acceptances of the discount offer that are required to trigger the first discount price, a second discount price less than the first discount price, a second minimum number of acceptances of the discount offer that are required to trigger the second discount price, and a time deadline for the discount offer;
receiving enrollment data from the plurality of users with mobile computers;
identifying the plurality of users with mobile computers that have submitted enrollment data to the server, wherein the enrollment data includes electronic payment information;
transmitting, via the communications network, the discount offer to the mobile computers of the plurality of users that were identified and further transmitting a countdown timer that counts down to the time deadline of the discount offer;
receiving acceptances of the discount offer from selected ones of the mobile computers of the plurality of users;
determining the initial price from the discount offer and accessing electronic payment information for each of the plurality of users that have submitted an acceptance of the discount offer to the server; wherein the electronic payment information includes credit card information for each of the plurality of users;
executing a preliminary credit card authorization transaction for each acceptance received, wherein the preliminary credit card authorization is effectuated for the initial price and wherein the preliminary credit card authorization is processed using the electronic payment information from the enrollment data for each of the plurality of users that has submitted the acceptance of the discount offer;
calculating a number of acceptances of the discount offer, wherein the number of acceptances is calculated to be greater than or equal to the second minimum number of acceptances of the discount offer;
triggering the second discount price;
detecting attainment of the time deadline; and
determining the second discount price from the defined discount offer and effectuating a sale of the product or service of the discount offer at the second discount price to each of the plurality of users that executed the preliminary credit card authorization transaction, wherein effectuating the sale comprises executing a final credit card authorization transaction at the second discount price.

8. The method of claim 7, further comprising:
attributing at least one sale of the product or service to a first user who recruited a buyer of the at least one sale, so as to award a commission to the first user.

9. The method of claim 7, further comprising:
transmitting a current number of acceptances of the discount offer to the mobile computers of the plurality of users via the communications network.

10. The method of claim 7, wherein the step of transmitting the discount offer further comprises:

transmitting computer program code to the mobile computers of the plurality of users together with the discount offer, wherein the computer program code comprises a countdown timer that counts down to the time deadline.

11. The method of claim 10, wherein the step of transmitting the discount offer further comprises:
transmitting the discount offer to the mobile computers of a plurality of users that are located in a defined geographical area.

12. The method of claim 11, wherein the step of transmitting the discount offer further comprises:
transmitting the discount offer to the mobile computers of a plurality of users having attributes that match a given description for one or more of the following attributes: account status, age, sex, income range, marital status, previous buying behavior.

13. A system for managing discount offers for a plurality of users with mobile computers over a communications network, comprising:
a memory storage;
a network connection device communicatively coupled with the communications network; and
a processing unit coupled to the memory storage, wherein the processing unit is configured for:
defining a discount offer, wherein the discount offer comprises at least a product or service description, an initial price, a discount price less than the initial price, a minimum number of acceptances of the discount offer that are required to trigger the discount price and a time deadline for the discount offer;
receiving enrollment data from the plurality of users with mobile computers;
identifying the plurality of users with mobile computers that have submitted enrollment data to the server, wherein the enrollment data includes electronic payment information;
transmitting, via the communications network, the discount offer to the mobile computers of the plurality of users that were identified, and further transmitting a countdown timer that counts down to the time deadline of the discount offer;
receiving acceptances of the discount offer from selected ones of the mobile computers of the plurality of users;
determining the initial price from the discount offer and accessing the electronic payment information for each of the plurality of users that have submitted an acceptance of the discount offer to the server; wherein the electronic payment information includes credit card information for each of the plurality of users;
executing a preliminary credit card authorization transaction for each acceptance received, wherein the preliminary credit card authorization is effectuated for the initial price and wherein the preliminary credit card authorization is processed using the electronic payment information from the enrollment data for each of the plurality of users that has submitted the acceptance of the discount offer;
calculating a number of acceptances of the discount offer, wherein the number of acceptances is calculated to be greater than or equal to the minimum number of acceptances of the discount offer;
triggering the discount price;
detecting attainment of the time deadline; and
determining the discount price from the defined discount offer and effectuating a sale of the product or service of the discount offer at the discount price to each of the plurality of users that executed the preliminary credit card authorization transaction, wherein effectuating the sale comprises executing a final credit card authorization transaction at the discount price.

14. The system of claim 13, wherein the processing unit is further configured for:
attributing at least one sale of the product or service to a first user who recruited a buyer of the at least one sale, so as to award a commission to the first user.

15. The system of claim 13, wherein the processing unit is further configured for:
transmitting a current number of acceptances of the discount offer to the mobile computers of the plurality of users via the communications network.

16. The system of claim 13, wherein the step of transmitting the discount offer further comprises:
transmitting computer program code to the mobile computers of the plurality of users together with the discount offer, wherein the computer program code comprises a countdown timer that counts down to the time deadline.

17. The system of claim 16, wherein the processing unit is further configured for:
receiving a request, from the computer program code in a first mobile computer of the plurality of users, for local time at the processing unit; and
transmitting a message to the first mobile computer, wherein the message includes the local time at the processing unit.

18. The system of claim 17, wherein the step of transmitting the discount offer further comprises: transmitting the discount offer to the mobile computers of a plurality of users that are located in a defined geographical area.

* * * * *